US012603036B2

(12) United States Patent
Sugino et al.

(10) Patent No.: US 12,603,036 B2
(45) Date of Patent: Apr. 14, 2026

(54) DRIVING CIRCUIT AND DISPLAY DEVICE

(71) Applicant: Sharp Display Technology Corporation, Kameyama City (JP)

(72) Inventors: Masafumi Sugino, Kameyama City (JP); Hajime Imai, Kameyama City (JP); Tatsuya Kawasaki, Kameyama City (JP); Yohei Takeuchi, Kameyama City (JP); Kengo Hara, Kameyama City (JP)

(73) Assignee: Sharp Display Technology Corporation, Kameyama City (JP)

( * ) Notice: Subject to any disclaimer, the term of this patent is extended or adjusted under 35 U.S.C. 154(b) by 0 days.

(21) Appl. No.: 19/203,428

(22) Filed: May 9, 2025

(65) Prior Publication Data

US 2025/0384809 A1 Dec. 18, 2025

(30) Foreign Application Priority Data

Jun. 17, 2024 (JP) ................................ 2024-097713

(51) Int. Cl.
*G09G 3/20* (2006.01)

(52) U.S. Cl.
CPC ... *G09G 3/2092* (2013.01); *G09G 2310/0267* (2013.01); *G09G 2310/0286* (2013.01); *G09G 2310/08* (2013.01)

(58) Field of Classification Search
CPC ..... G09G 3/2092; G09G 3/3674–3677; G09G 2310/0267; G09G 2310/0286; G09G 2310/08
See application file for complete search history.

(56) References Cited

U.S. PATENT DOCUMENTS 7,203,264 B2 * 4/2007 Lo .......................... G11C 19/28 377/64
9,076,370 B2 * 7/2015 Tanaka ................. G09G 3/3677
10,186,221 B2 * 1/2019 Shang ..................... G11C 19/28
10,283,030 B2 * 5/2019 Zhou ....................... G11C 19/28
12,067,945 B2 * 8/2024 Oh ........................ G09G 3/3266
2006/0291610 A1 * 12/2006 Lo .......................... G11C 19/28 377/64
2010/0201659 A1 8/2010 Miyake et al.
2013/0093025 A1 4/2013 Miyake et al.
2014/0035891 A1 * 2/2014 Tanaka ..................... G09G 3/36 345/204

(Continued)

FOREIGN PATENT DOCUMENTS

JP 2019-113863 A 7/2019

*Primary Examiner* — Michael Pervan
(74) *Attorney, Agent, or Firm* — ScienBiziP, P.C.

(57) ABSTRACT

A driving circuit includes a first transistor outputting a drive signal, and a third transistor supplied with a reset signal. A source electrode of the first transistor is supplied with a first clock signal. A source electrode of the third transistor is supplied with a second clock signal. The second clock signal has a phase different from a phase of the first clock signal. The second clock signal has a voltage that remains at a high level for a time period from a start point to an end point within a time period throughout which a potential of a node is higher than a gate-on voltage of the third transistor. The start point is prior to a time point of supplying the reset signal. The end point falls between the time point of supplying the reset signal and a time point of stopping supplying the reset signal.

4 Claims, 9 Drawing Sheets

1a

(56) References Cited

U.S. PATENT DOCUMENTS

| | | | | |
|---|---|---|---|---|
| 2015/0279480 | A1* | 10/2015 | Murakami | G09G 3/3677 345/100 |
| 2015/0303913 | A1 | 10/2015 | Miyake et al. | |
| 2018/0190173 | A1* | 7/2018 | Feng | G09G 3/20 |
| 2018/0234090 | A1 | 8/2018 | Miyake et al. | |
| 2018/0301075 | A1* | 10/2018 | Zhou | G09G 3/20 |
| 2022/0278680 | A1 | 9/2022 | Miyake et al. | |
| 2023/0197012 | A1* | 6/2023 | Oh | G11C 19/28 345/204 |

* cited by examiner

COMPARATIVE EXAMPLE

COMPARATIVE EXAMPLE

COMPARATIVE EXAMPLE

EXAMPLE

DRIVING CIRCUIT AND DISPLAY DEVICE

BACKGROUND

1. Field

The present disclosure relates to a driving circuit and a display device.

2. Description of the Related Art

A driving circuit disclosed in Japanese Unexamined Patent Application Publication No. 2019-113863 discloses a driving circuit including first through fourth transistors. The first transistor outputs an output signal in response to supplying of an input clock signal. In response to supplying of a prior-stage signal (set signal), the second transistor charges a node connected to the gate electrode of the first transistor. A lower potential is constantly applied to the source electrode of the third transistor. In response to the supplying of a reset signal, the third transistor transitions to a lower potential (resets) the potential of the node connected to the gate electrode of the first transistor. The fourth transistor is connected to a portion of the node connected to the first transistor and a portion of the node connected to the second transistor.

In the driving circuit disclosed in Japanese Unexamined Patent Application Publication No. 2019-113863, the portion of the node connected to the first transistor rises in potential in response to a bootstrap operation when an output signal (drive signal) is output. On the other hand, the fourth transistor restricts a rise of the potential of the portion of the node connected to the second transistor. As a result, the voltage applied to the second transistor may be reduced and deterioration of the second transistor supplied with the set signal may be controlled.

The third transistor (used to discharge the node in response to the supplying of the reset signal) in the driving circuit disclosed in Japanese Unexamined Patent Application Publication No. 2019-113863 is in a state in which a higher potential difference (a higher voltage between the drain and source) occurs between the potential of the node (the potential of the drain electrode) and the lower potential (the potential of the source electrode) when the gate electrode shifts to a higher level. The deterioration of the third transistor is difficult to control.

SUMMARY

The disclosure has been made to address the above problem. It is desirable to provide a driving circuit and a display device that are able to reduce the speed of deterioration of a transistor that causes a node in a unit circuit to discharge.

According to a first aspect of the disclosure, there is provided a driving circuit, having a plurality of stages and supplying a drive signal to scanning signal lines in a scanning signal line group in response to supplying a first clock signal and a second clock signal, the driving circuit including: a first unit circuit forming one of the stages and outputting the drive signal to one of the scanning signal lines in the scanning signal line group, wherein the first unit circuit includes: a node; a first transistor that outputs the drive signal to the scanning signal line, with a gate electrode of the first transistor connected to the node, a source electrode of the first transistor supplied with the first clock signal and a drain electrode of the first transistor connected to the scanning signal line; a second transistor that is supplied with a set signal for the first unit circuit, with a gate electrode of the second transistor supplied with the set signal and a drain electrode of the second transistor connected to the node; a third transistor that is supplied with a reset signal for the first unit circuit, with a gate electrode of the third transistor supplied with the reset signal and a drain electrode of the third transistor connected to the node, wherein the second clock signal has a phase different from a phase of the first clock signal, and has a voltage remaining at a high level for a time period from a start point to an end point, the start point being prior to a time point of supplying the reset signal and within a time period throughout which a potential of the node is higher than a gate-on voltage of the third transistor and the end point falling between the time point of supplying the reset signal and a time point of stopping supplying the reset signal, and wherein the third transistor is configured to receive the second clock signal at a source electrode of the third transistor.

According to a second aspect of the disclosure, there is provided a display device including: the driving circuit according to the first aspect; and a substrate where the scanning signal line group is mounted.

DESCRIPTION OF THE EMBODIMENTS

Figure 1:
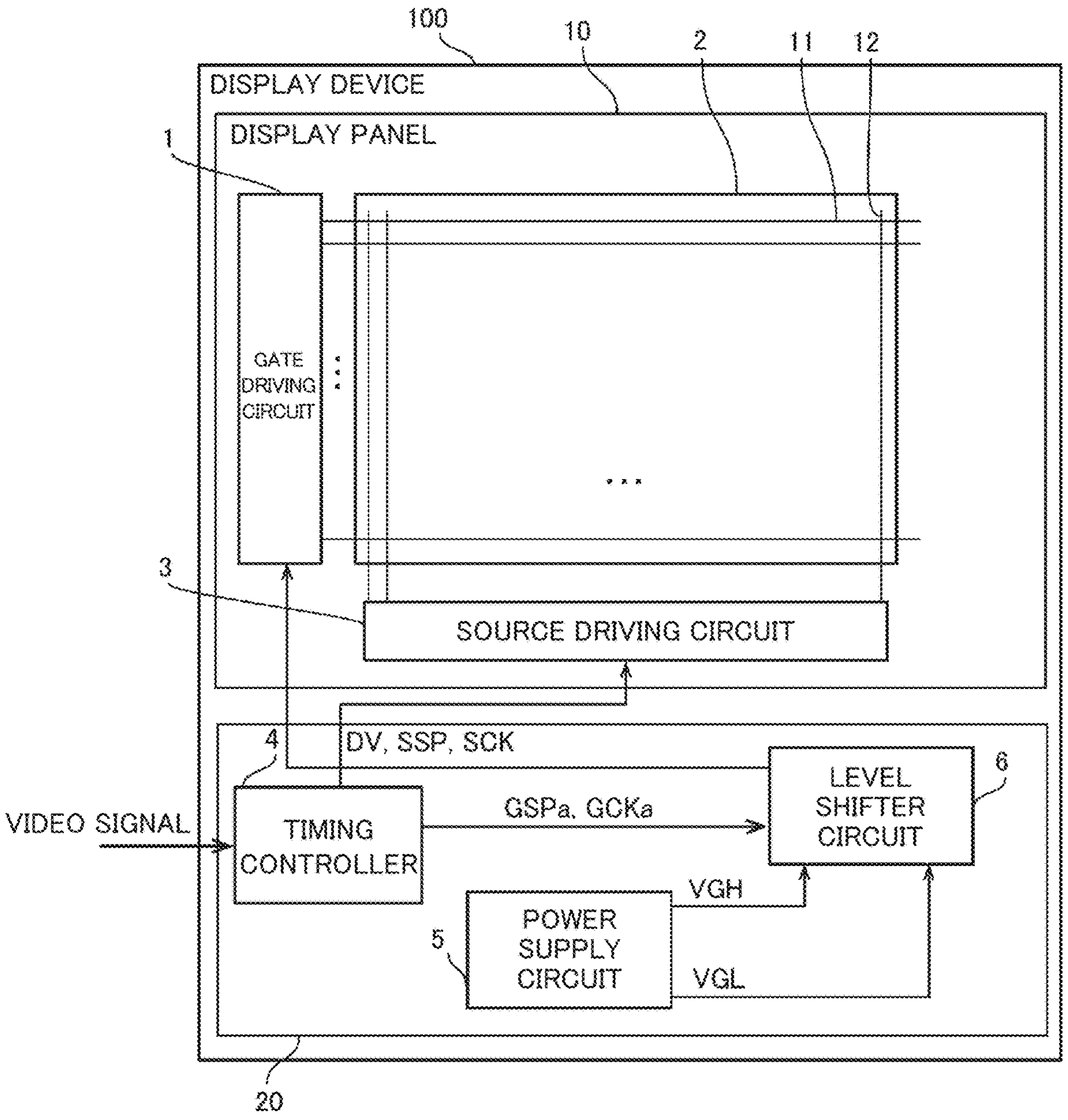
FIG. 1 is a block diagram illustrating the configuration of a display device of an embodiment.

Embodiment of the disclosure is described with reference to the drawings. The disclosure is not limited to the embodiment described below. The embodiment may be appropriately modified without departing from the scope of the disclosure. In the discussion that follows, like elements or elements having the same function are designated with the same reference numerals throughout different drawings and the discussion thereof are not repeated. Configurations in the embodiment and modifications of the embodiment may be combined or changed without departing from the scope of the disclosure. For easier understanding, the configurations may be simplified or clarified in the drawings, and some of components in each configuration may be omitted.

Entire Configuration of Display Device

Figure 2:
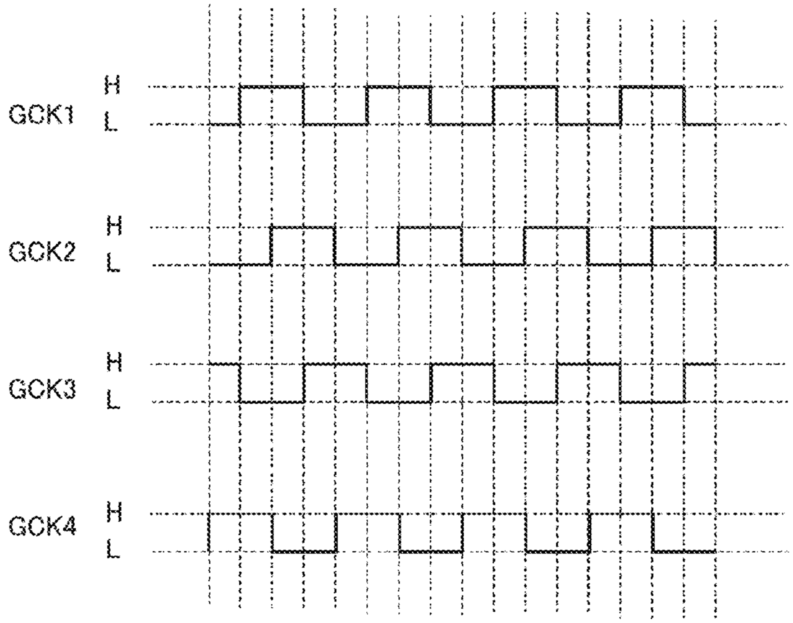
FIG. 2 is a timing diagram illustrating phases of clock signals.
Figure 3:
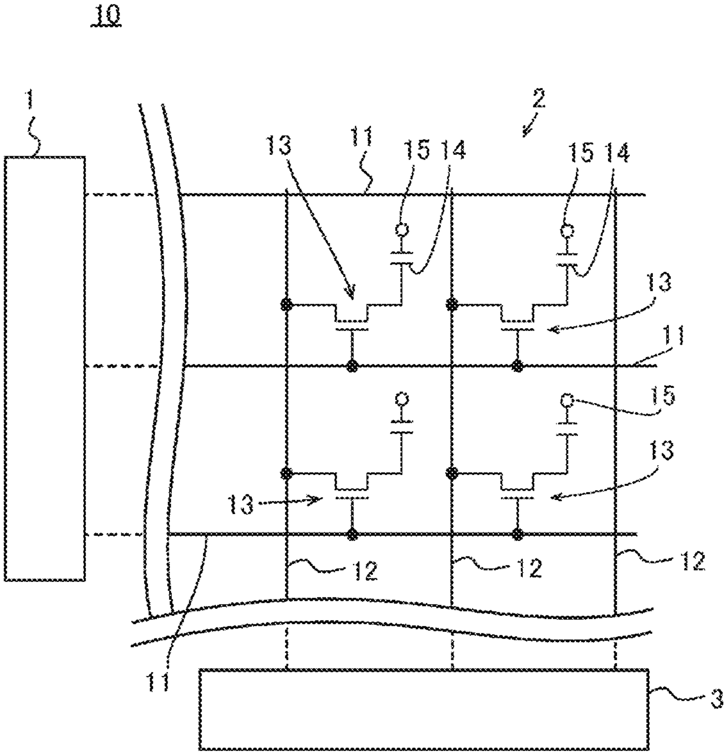
FIG. 3 is a block diagram illustrating the configuration of a display panel.

FIG. 1 is a block diagram illustrating a display device 100 of an embodiment. FIG. 2 is a timing diagram illustrating phases of clock signals GCK1 through GCK4. FIG. 3 is a block diagram illustrating the configuration of a display panel 10.

Referring to FIG. 1, the display device 100 includes the display panel 10 and control substrate 20. The display panel 10 is connected to the control substrate 20 via a flexible printed board or the like. The display panel 10 includes a gate driving circuit 1, a display 2 serving as a region where images are displayed, and a source driving circuit 3. The control substrate 20 includes a timing controller 4, a power supply circuit 5, and a level shifter circuit 6.

Referring to FIG. 1, the timing controller 4 receives timing signals (a horizontal synchronization signal, a vertical synchronization signal, a data enable signal, and the like) and a video signal, and generates in response to the received signals a digital video signal DV, a source start pulse signal SSP, a source clock signal SCK, a gate start pulse signal GSPa, and a gate clock signal GCKa. The timing controller 4 transmits to the source driving circuit 3 the digital video signal DV, the source start pulse signal SSP, and the source clock signal SCK. The timing controller 4 transmits to the level shifter circuit 6 the gate start pulse signal GSPa and the gate clock signal GCKa.

Based on power supplied from an external power supply (not illustrated) or a battery (not illustrated), the power supply circuit 5 generates a gate-on voltage VGH and a gate-off voltage VGL. The gate-on voltage VGH and the gate-off voltage VGL are voltages having a constant direct-current voltage level (constant voltage values). The level at the same level as the gate-on voltage VGH is referred to a "high level" and denoted as "H" in the drawings. The level at the same level as the gate-off voltage VGL is referred to as a "low level" and denoted as "L" in the drawings.

The level shifter circuit 6 generates a gate start pulse signal GSP and the clock signals GCK1 through GCK4 in response to the gate-on voltage VGH and the gate-off voltage VGL. Referring to FIG. 2, the clock signals GCK1 through GCK4 repeat a transition between the high level and the low level and control the operation of the gate driving circuit 1. The clock signal GCK2 is delayed by 90 degrees from the clock signal GCK1. The clock signal GCK3 is delayed by 180 degrees from the clock signal GCK1. The clock signal GCK4 is delayed by 270 degrees from the clock signal GCK1. The gate start pulse signal GSP starts driving the gate driving circuit 1 and serves as a set signal that is supplied to a unit circuit 1*a* as the first stage and a unit circuit 1*a* as the second stage in the gate driving circuit 1.

Referring to FIG. 3, the gate driving circuit 1 is arranged on one side of the display 2. The gate driving circuit 1 is a gate-on array (GOA) formed on an active matrix substrate of the display panel 10.

The display panel 10 includes multiple gate lines 11 forming a scanning signal line group connected to the gate driving circuit 1 and multiple source lines 12 forming a source signal line group connected to the source driving circuit 3. The gate lines 11 and the source lines 12 are arranged to intersect each other and pixels are arranged in regions that are defined by the gate lines 11 and the source lines 12. The multiple pixels are arranged in a matrix on the display panel 10.

Referring to FIG. 3, a pixel transistor 13 and a pixel electrode 14 are arranged in each pixel. The gate electrode of the pixel transistor 13 is connected to the gate line 11. The source electrode of the pixel transistor 13 is connected to the source line 12. The drain electrode of the pixel transistor 13 is connected to the pixel electrode 14.

When the pixel transistor 13 is turned on by a drive signal (gate signal) supplied via the gate line 11, a source signal supplied via the source line 12 is written (charged) on the pixel electrode 14. In this way, an electric field is generated between the pixel electrode 14 and a common electrode 15 that is arranged opposite to the pixel electrode 14. The display 2 includes an active matrix substrate, a counter substrate arranged opposite to the active matrix substrate, and a liquid-crystal layer arranged between the active matrix substrate and the counter substrate. The liquid-crystal layer is driven by the electric field generated between the pixel electrode 14 and the common electrode 15 and displays an image on the display panel 10.

Configuration of Gate Driving Circuit 1

Figure 4:
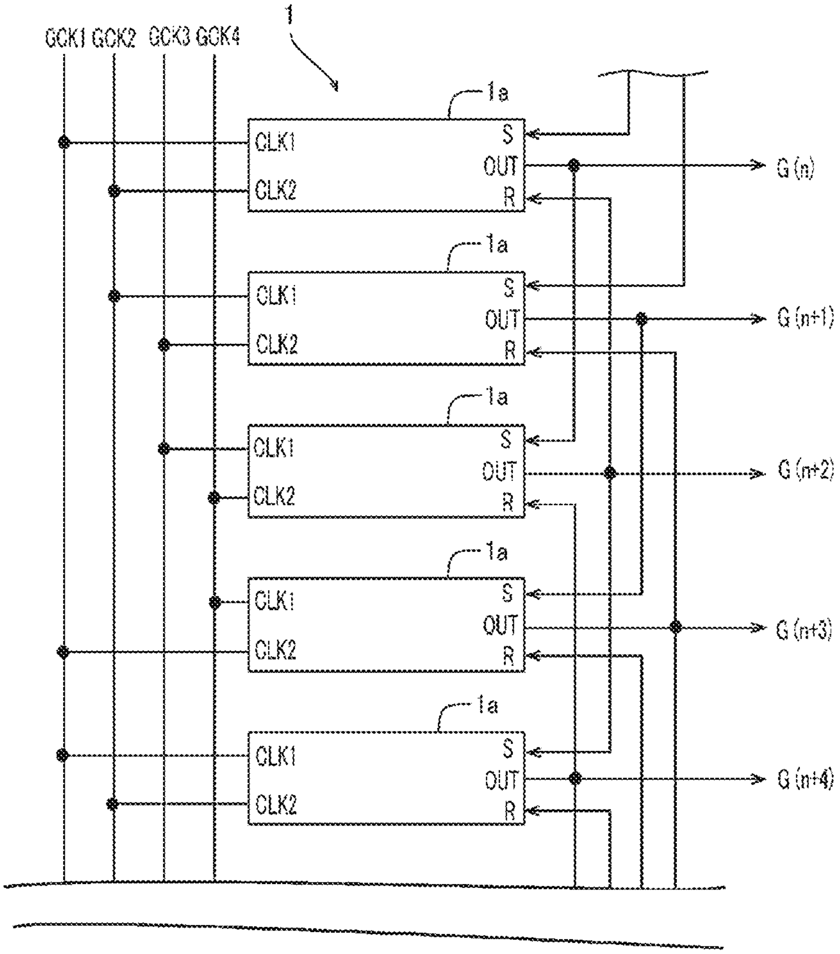
FIG. 4 illustrates the configuration of a gate driving circuit.
Figure 5:
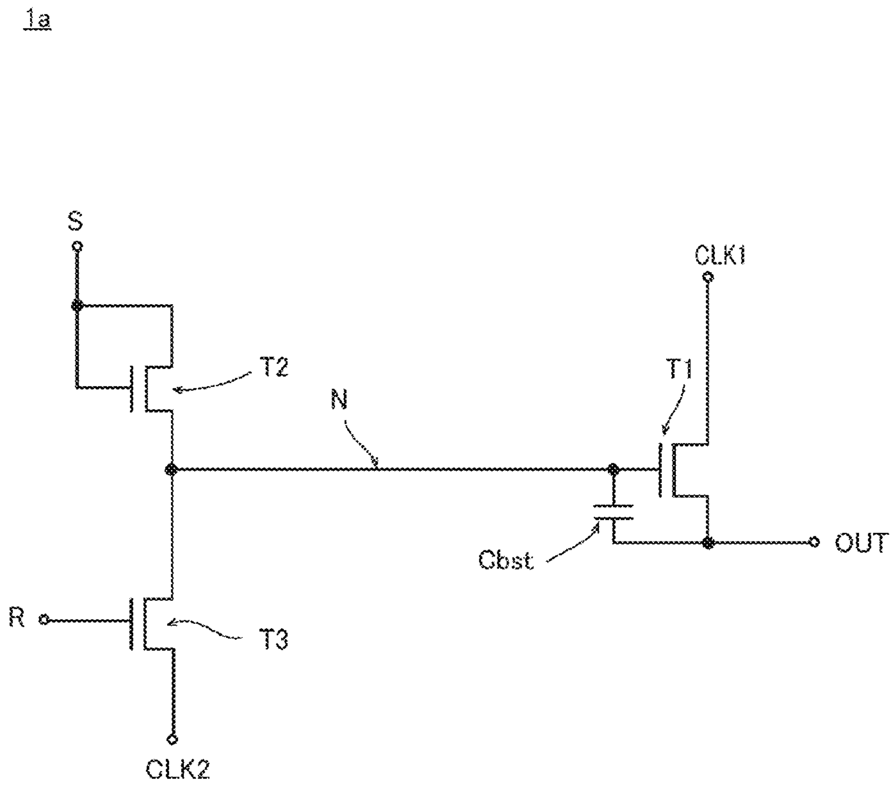
FIG. 5 is a circuit diagram illustrating the configuration of a unit circuit.

FIG. 4 illustrates the configuration of the gate driving circuit 1. FIG. 5 is the circuit diagram illustrating the configuration of the unit circuit 1*a*.

Referring to FIG. 4, the gate driving circuit 1 having multiple stages includes a shift register circuit that supplies successively a drive signal to the gate lines 11(G) in response to supplying of the clock signals GCK1 through GCK4. The gate driving circuit 1 includes multiple unit circuits 1*a* that respectively form stages and output drive signals to the gate lines 11 connected the unit circuits 1*a*. The number of unit circuits 1*a* equals the number of gate lines 11. FIG. 4 illustrates a subset of the unit circuits 1*a* (five unit circuits 1*a*).

According to the embodiment, the unit circuit 1*a* is supplied with any two signals of the clock signals GCK1 through GCK4 from the level shifter circuit 6. For example, the unit circuit 1*a* at an n-th stage (n is an integer number) is supplied with the clock signals GCK1 and GCK2, the unit circuit 1*a* at an (n+1)-th stage is supplied with the clock signals GCK2 and GCK3, the unit circuit 1*a* at an (n+2)-th stage is supplied with the clock signals GCK3 and GCK4, the unit circuit 1*a* at an (n+3)-th stage is supplied with the clock signals GCK4 and GCK1, and the unit circuit 1*a* at an (n+4)-th stage is supplied with the clock signals GCK1 and GCK2. In other words, the unit circuit 1*a* is supplied with a clock signal having a phase delayed by 90 degrees from the phase of the clock signal input to the immediately prior stage.

The unit circuit 1*a* at a stage of interest is supplied with at a terminal S a drive signal as a set signal output from the terminal OUT of the unit circuit 1*a* before the stage of interest (the unit circuit 1*a* at the second stage before the stage of interest in FIG. 4). The unit circuit 1*a* at the stage of interest is supplied with at the terminal R a drive signal as a reset signal output from the terminal OUT of the unit circuit 1*a* after the stage of interest (the unit circuit 1*a* at the second stage after the stage of interest in FIG. 4). The unit circuit 1*a* at the first stage and the unit circuit 1*a* at the second stage are supplied with the gate start pulse signal GSP as a set signal. When the unit circuit 1*a* at the first stage and the unit circuit 1*a* at the second stage are supplied with the gate start pulse signal GSP as a set signal, the unit circuit 1*a* at the first stage through the unit circuit 1*a* at the final stage successively output the drive signals to the gate lines 11.

Referring to FIG. 5, the unit circuit 1*a* includes transistors T1 through T3, a bootstrap capacitor Cbst, and a node N. The node N connects the transistors T1 through T3 to the bootstrap capacitor Cbst.

The transistor T1 is used to output the drive signal to the gate line 11 connected to the unit circuit 1*a*. The transistor T1 outputs the drive signal to the gate line 11 in response to any of the clock signals GCK1 through GCK4 supplied to a terminal CLK1. The bootstrap capacitor Cbst is used to turn the transistor T1 on in response to a potential of the bootstrap capacitor Cbst that has risen by charging.

The gate electrode of the transistor T1 is connected to the node N. The source electrode of the transistor T1 is connected to the terminal CLK1. The drain electrode of the transistor T1 is connected to the terminal OUT to which the drive signal is output. The one end of the bootstrap capacitor Cbst is connected to the gate electrode of the transistor T1 and the other end of the bootstrap capacitor Cbst is connected to the drain electrode of the transistor T1.

The transistor T2 is used to raise the potential of the node N (charge the node N) in response to the supplying of the set signal. The gate electrode and source electrode of the transistor T2 is connected to the terminal S supplied with the set signal. The drain electrode of the transistor T2 is connected to the node N.

The transistor T3 is used to lower the potential of the node N (to cause the node N to be discharged) in response to the supplying of the reset signal. The gate electrode of the transistor T3 is connected to the terminal R supplied with the reset signal. According to the embodiment, the source electrode of the transistor T3 is connected to a terminal CLK2. The terminal CLK2 is supplied with one of the clock signals GCK1 through GCK4 that is different in phase from another one of the clock signals GCK1 through GCK4 that is supplied to the terminal CLK1. For example, the terminal CLK2 is supplied with a clock signal delayed in phase by 90 degrees from the phase of the clock signal supplied to the terminal CLK1. The drain electrode of the transistor T3 is connected to the node N.

Semiconductor layers of the transistors T1 through T3 contain oxide semiconductor. Oxide semiconductor may be indium-gallium-zinc-oxide (In—Ga—Zn—O) based semiconductor having crystallinity. In comparison with the case in which each transistor is manufactured of amorphous silicon, the transistors T1 through T3 may feature lower power consumption, faster driving and higher definition characteristics.

Operation of Unit Circuit 1*a*

Figure 6:
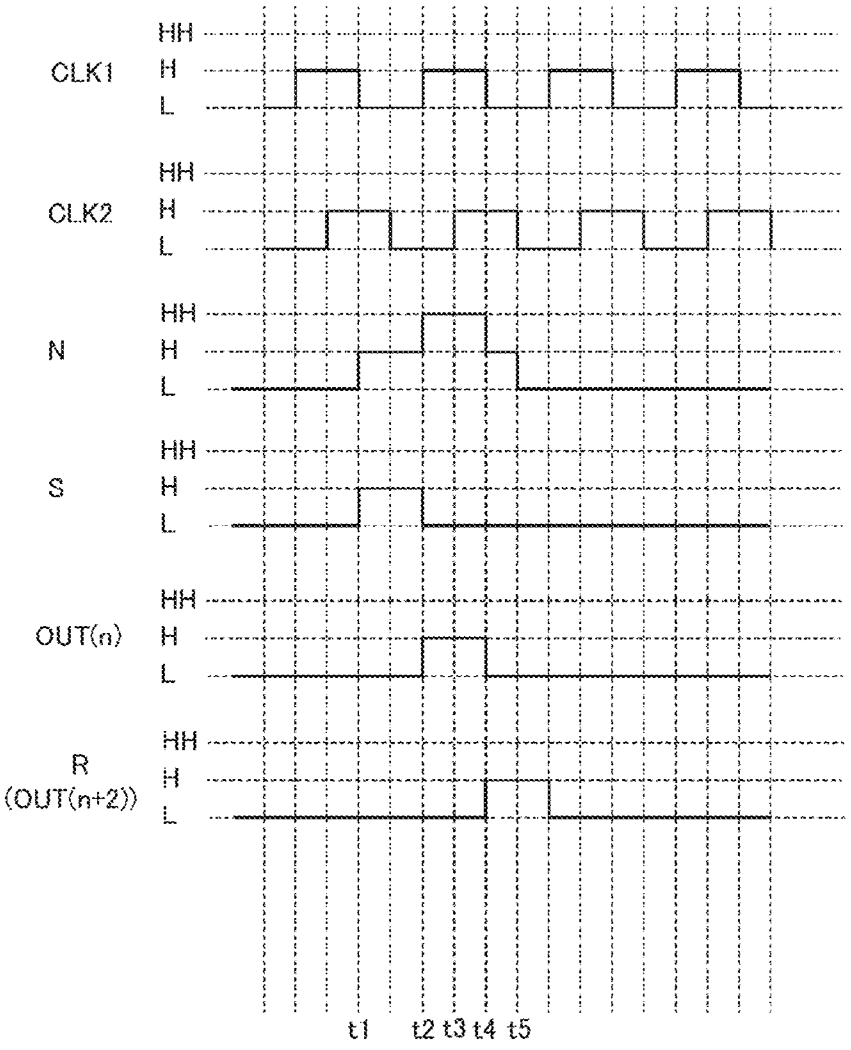
FIG. 6 is a timing diagram illustrating the relationship between each terminal of the unit circuit and the potential of the terminal in the embodiment.

FIG. 6 is a timing diagram illustrating the relationship between each terminal of the unit circuit 1*a* of the embodiment and the potential of the terminal. An example of the relation between each terminal of the unit circuit 1*a* at the n-th stage and the potential of the terminal is illustrated in FIG. 6.

Referring to FIG. 6, the clock signal GCK1 is supplied to the terminal CLK1 of the unit circuit 1*a*. Referring to FIG. 4, the clock signal GCK2 is supplied to the terminal CLK1 of the (n+1)-th unit circuit 1*a*, and the clock signal GCK3 is supplied to the terminal CLK1 of the (n+2)-th unit circuit 1*a*. The clock signal GCK4 is supplied to the terminal CLK1 of the (n+3)-th unit circuit 1*a*, and the clock signal GCK1 is supplied to the terminal CLK1 of the (n+4)-th unit circuit 1*a*. A voltage higher than the high level is denoted by "HH."

When the set signal is supplied to the terminal S at time point t1 (when the voltage at the terminal S rises to "H"), the node N is charged to "H" from "L." When the potential of the terminal CLK1 rises to "H" at time point t2, the potential of the node N rises from "H" to "HH" because of the capacitance of the bootstrap capacitor Cbst arranged between the node N and the drain electrode of the transistor T1. The potential of the terminal OUT is thus at "H," the gate signal is output, the set signal is supplied to the unit circuit 1*a* at the second stage after the stage of interest, and the reset signal is supplied to the unit circuit 1*a* at the second stage before the stage of interest.

The potential of the terminal CLK2 shifts from L to H at time point t3. At time point t4, the potential of the terminal CLK1 shifts from H to L and the potential of the node N falls from HH to H. With the reset signal supplied to the terminal R, the potential of the terminal R shifts from L to H. Since the node N and the terminal CLK2 are at H, the transistor T3 is not turned on (remains off). When the potential of the terminal CLK2 shifts from H to L at time point t5, the transistor T3 is turned on and the node N is discharged via the transistor T3. The potential of the node N thus sifts from H to L. According to the embodiment, the clock signal GCK2 that is supplied to the terminal CLK2 has a phase different from the phase of the clock signal GCK1 to be supplied to the terminal CLK1 and has a voltage H from time point t3 to time point t5. The time point t3 is prior to time point t4 when the reset signal is supplied and time point t5 is at the same time as or later than the time point t4 when the reset signal is supplied.

In the configuration described above, while the potential of the node N is higher and the potential of the drain electrode of the transistor T3 is higher, a second clock signal having a higher potential is supplied to the source electrode of the transistor T3. An increase in the drain-source voltage of the transistor T3 may thus be controlled. As a result, the drain-source voltage applied to the transistor T3 that serves to discharge the node N of the unit circuit may be reduced, leading to a reduction in the speed of deterioration of the transistor T3.

The clock signal GCK2 is supplied to the terminal CLK1 of the (n+1)-th unit circuit 1*a*. Without supplying to the gate driving circuit 1 a new clock signal in addition to the clock signals GCK1 through GCK4, the clock signal GCK2 to be supplied to the (n+1)-th unit circuit 1*a* may be used as a clock signal to be supplied to the transistor T3 in the n-th unit circuit 1*a*.

The clock signal GCK3 is supplied to the terminal CLK1 of the (n+2)-th unit circuit 1*a*. Without supplying to the gate driving circuit 1 a new clock signal in addition to the clock signals GCK1 through GCK4, the clock signal GCK3 to be supplied to the (n+2)-th unit circuit 1*a* may be used as a clock signal to be supplied to the transistor T3 in the (n+1)-th unit circuit 1*a*.

Comparison Results with Comparative Example

Comparison results of an example of the embodiment with comparative examples are described with reference to FIGS. 7 through 10. In the comparative examples, the same reference numerals are used for elements identical to those in the example of the embodiment and the discussion of the elements are not duplicated.

Figure 7:
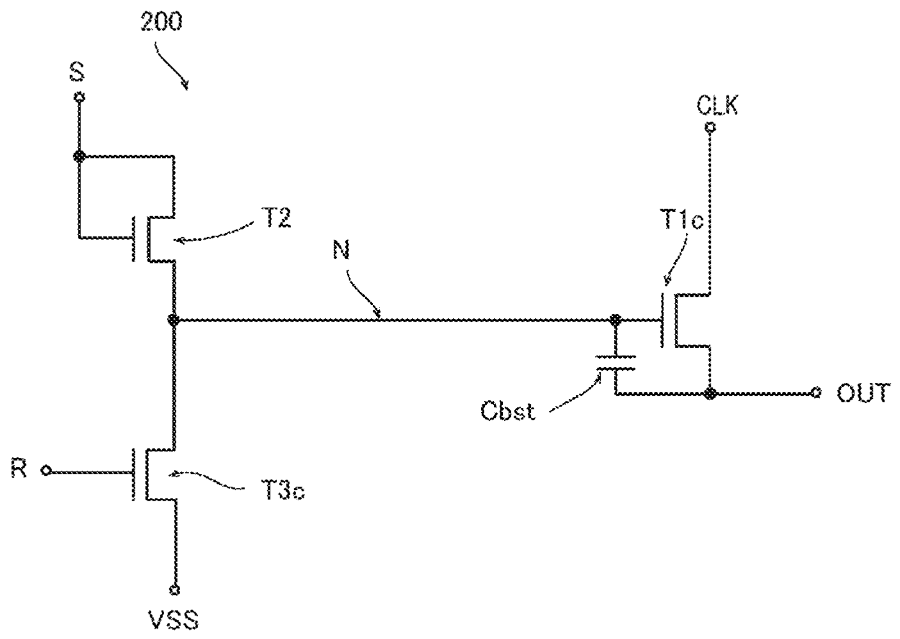
FIG. 7 illustrates the configuration of a unit circuit serving as a comparative example.

FIG. 7 illustrates the configuration of a unit circuit 200 as a comparative example. The unit circuit 200 includes transistors T1c and T3c. The source electrode of the transistor T1c is connected to the terminal CLK. The source electrode of the transistor T3c is connected to a terminal VSS. A voltage value Vgpp as a difference between the gate-on voltage and the gate-off voltage applied to the unit circuit 200 is, for example, 28 V. The screen size of a display device having thereon the unit circuit 200 as the comparative example is 15.6 inches.

Figure 8:
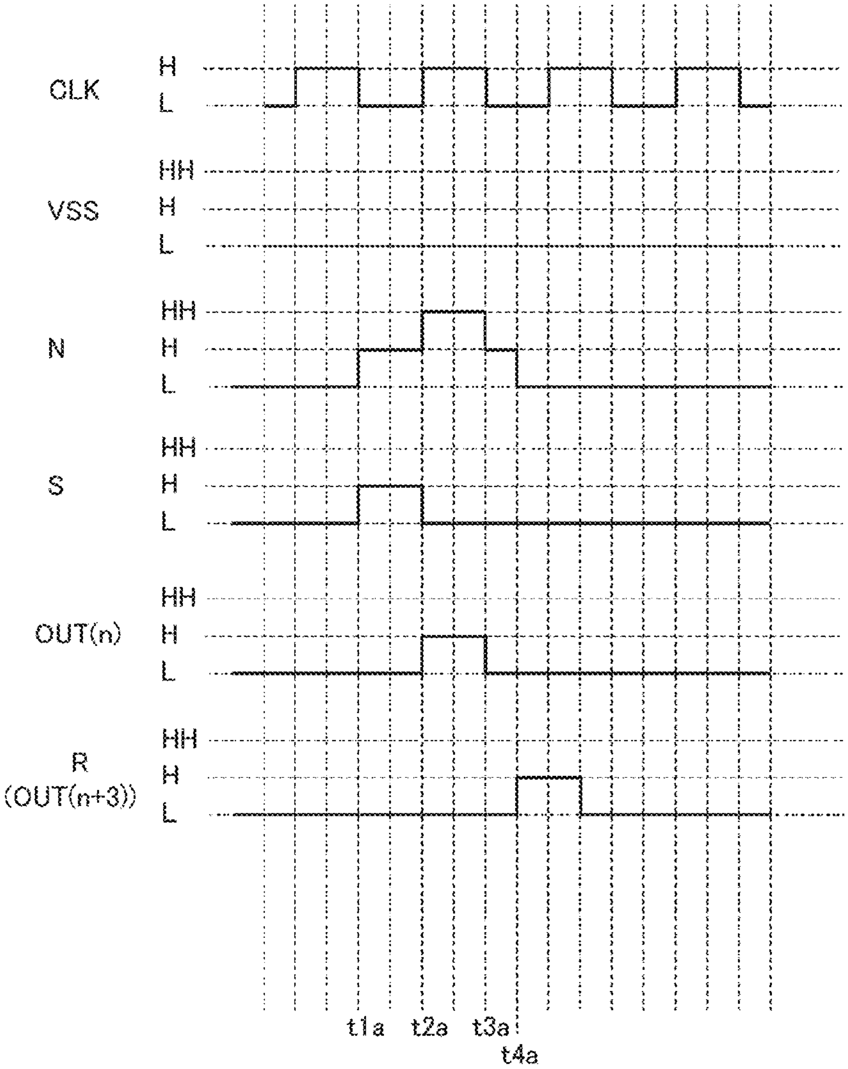
FIG. 8 is a timing diagram illustrating the relationship between each terminal of the unit circuit and the potential of the terminal in the comparative example.
Figure 9:
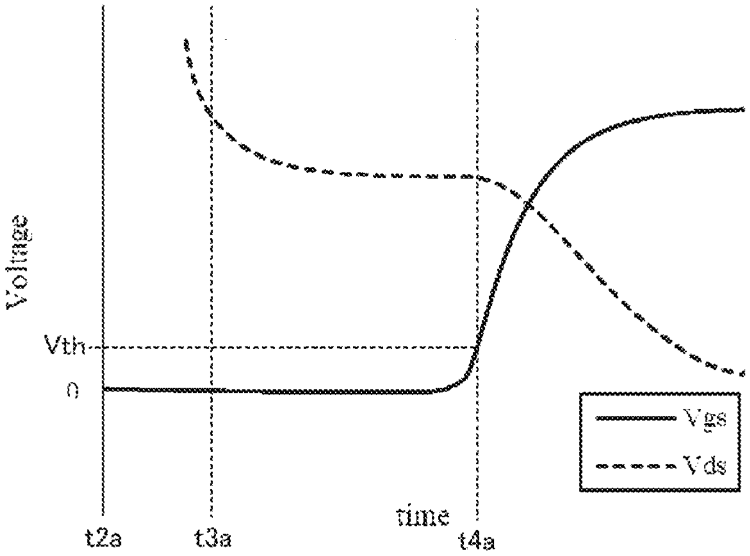
FIG. 9 illustrates the waveform of a voltage applied to a transistor in the unit circuit of the comparative example.

FIG. 8 is a timing diagram illustrating the relationship between each terminal of the unit circuit 200 as the comparative example and the potential of the terminal. FIG. 8 also illustrates an n-th unit circuit as the comparative example. FIG. 9 illustrates the waveform of a voltage applied to a transistor T3c in the unit circuit 200 as the comparative example. As illustrated in FIG. 8, the potential of the terminal VSS is constantly at L. When the set signal is supplied to the terminal S at time point t1a (the terminal S rises to H), the node N is charged to H from L. When the potential of the terminal CLK shifts to H at time point t2a, the potential of the node N rises from H to HH through the capacitance of the bootstrap capacitor Cbst arranged between the node N and the drain electrode of the transistor T1c. The potential of the terminal OUT shifts to H and the gate signal is output.

At time point t3a, the potential of the terminal CLK shifts from H to L and the potential of the node N falls from HH to H. Then at time point t4a, in response to the inputting of the reset signal to the terminal R, the terminal R shifts in potential from L to H. At time point t4a, as illustrated in FIG. 9, a voltage Vds (a voltage difference between the drain electrode and the source electrode) when a voltage Vgs (a voltage difference between the gate electrode and the source electrode) of the transistor T3c becomes a value closer to a threshold voltage Vth of the transistor T3c is 21 V.

Figure 10:
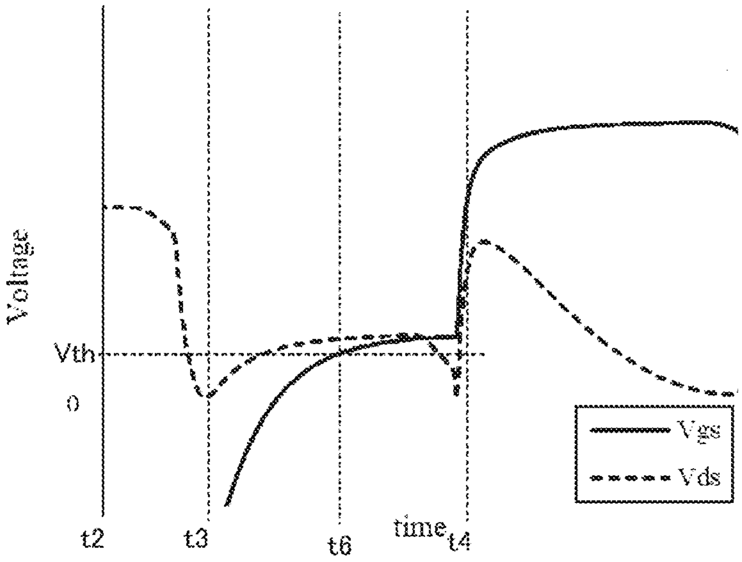
FIG. 10 illustrates the waveform of a voltage applied to a transistor in the unit circuit of an example of the embodiment.

FIG. 10 illustrates the waveform of a voltage applied to the transistor T3 in the unit circuit 1*a* of an example of the embodiment. In the unit circuit 1*a* of the example of the embodiment, the screen size of the display device 100 is 15.6 inches and the voltage value Vgpp as a difference between the gate-on voltage and the gate-off voltage applied to the unit circuit 1*a* is 28 V. In the unit circuit 1*a* of the example, the voltage Vds when the voltage Vgs of the transistor T3 shifts to a value closer to the threshold voltage Vth of the transistor T3 (at time point t6) is 6 V as illustrated in FIG. 10. As a result, in comparison with the unit circuit 200 as the comparative example, the unit circuit 1*a* of the example may reduce the voltage Vds that stresses transistors.

Modifications

The embodiment has been described for exemplary purposes only. The disclosure is not limited to the embodiment and may be modified within a range that does not depart from the scope of the disclosure. Modifications of the embodiment are described below.

(1) According to the embodiment, the display device is a liquid-crystal display device but the display device is not limited to the liquid-crystal display device. For example, the display device may be an organic electroluminescent (EL) display device or a micro-light-emitting-diode (LED) display device.

(2) According to the embodiment, the clock signals are four-phase clock signals including the clock signals GCK1 through GCK4 but the clock signals are not limited to the four-phase clock signals. The clock signals may be single-phase to three-phase clock signals or five- or higher-phase clock signals.

(3) According to the embodiment, the clock signal to be supplied to the transistor T3 is the clock signal to be supplied to the transistor T1 in another unit circuit but the disclosure is not limited to this method. A clock signal not used in another unit circuit may be exclusively prepared for the transistor T3.

(4) According to the embodiment, the transistors contain In—Ga—Zn—O based semiconductor having crystallinity but the transistors are not limited to the indium-gallium-zinc-oxide (In—Ga—Zn—O) based semiconductor having crystallinity. The transistors may contain amorphous In—Ga—Zn—O based semiconductor, oxide semiconductor that is not based on In—Ga—Zn—O, or silicon.

(5) According to the embodiment, the bootstrap capacitor Cost is arranged in the unit circuit but the disclosure is not limited to this arrangement. If a capacitance of the transistor T1 is able to perform a bootstrap operation, the unit circuit may be free of the bootstrap capacitor.

(6) According to the embodiment, the clock signal to be supplied to the transistor T3 is the clock signal delayed in phase by 90 degrees from the clock signal to be supplied to the transistor T1 but the disclosure is not limited to this method. For example, the clock signal to be supplied to the transistor T3 may be delayed in phase from the clock signal to be supplied to the transistor T1 by within a range higher than 0 degree and lower than 180 degrees. In other words, the clock signal to be supplied to the transistor T3 may have a voltage remaining at H (high level) for a time period from a start point to an end point. The start point is prior to a time point of supplying the reset signal (time point t4 in FIG. 6) and within a time period throughout which the potential of the node N is at "HH" higher than the gate-on voltage "H" (from time point t2 to time point t4 as illustrated in FIG. 6) and the end point is a time point falling between the time point of supplying the reset signal and a time point of stopping the supplying of the reset signal.

The configurations described above are also described as below.

A driving circuit according to a first configuration, having a plurality of stages and supplying a drive signal to scanning signal lines in a scanning signal line group in response to supplying a first clock signal and a second clock signal, the driving circuit including: a first unit circuit forming one of the stages and outputting the drive signal to one of the scanning signal lines in the scanning signal line group, wherein the first unit circuit includes: a node; a first transistor that outputs the drive signal to the scanning signal line, with a gate electrode of the first transistor connected to the node, a source electrode of the first transistor supplied with the first clock signal and a drain electrode of the first transistor connected to the scanning signal line; a second transistor that is supplied with a set signal for the first unit circuit, with a gate electrode of the second transistor supplied with the set signal and a drain electrode of the second transistor connected to the node; a third transistor that is supplied with a reset signal for the first unit circuit, with a gate electrode of the third transistor supplied with the reset signal and a drain electrode of the third transistor connected to the node, wherein the second clock signal has a phase different from a phase of the first clock signal, and has a voltage remaining at a high level for a time period from a start point to an end point, the start point being prior to a time point of supplying the reset signal and within a time period throughout which a potential of the node is higher than a gate-on voltage of the third transistor and the end point falling between the time point of supplying the reset signal and a time point of stopping supplying the reset signal, and wherein the third transistor is configured to receive the second clock signal at a source electrode of the third transistor (first configuration).

According to the first configuration, within the time period throughout which the potential of the node (the potential of the drain electrode of the third transistor) is higher than the gate-on voltage of the third transistor, the second clock signal having a higher potential is supplied to the source electrode of the third transistor before the reset signal is supplied to the gate electrode of the third transistor. Since the potential difference between the source electrode and the drain electrode of the third transistor is reduced in this way, an increase in the drain-source voltage may be controlled. As a result, the drain-source voltage to be applied to the third transistor that discharges the node of the unit circuit may be reduced and the speed of deterioration of the third transistor may be reduced.

The driving circuit according to the first configuration may further include a second unit circuit that outputs a drive signal in response to the supplying of the second clock signal (second configuration).

According to the second configuration, without supplying a new clock signal to the driving circuit, the second clock signal to be supplied to the second unit circuit may be used as the second clock signal to be supplied to the third transistor of the first unit circuit.

The driving circuit according to one of the first and second configurations may further include a third unit circuit that outputs a drive signal in response to supplying of a third clock signal, the third clock signal having a phase different from the phase of the first clock signal and the phase of the second clock signal. The second unit circuit may include a fourth transistor that is supplied with a second-unit-circuit reset signal, with a gate electrode of the fourth transistor supplied with the second-unit-circuit reset signal and a source electrode of the fourth transistor supplied with the third clock signal (third configuration).

According to the third configuration, without supplying a new clock signal to the driving circuit, the third clock signal may be supplied to the fourth transistor in the second unit circuit.

A display device according to a fourth configuration include: the driving circuit according to one of the first through third configurations; and a counter substrate where the driving circuit is mounted (fourth configuration).

Since the drain-source voltage to be applied to the third transistor that discharges the node of the unit circuit may be reduced in the fourth configuration, the display device enabled to reduce the speed of deterioration of the third transistor may be provided.

The present disclosure contains subject matter related to that disclosed in Japanese Priority Patent Application JP 2024-097713 filed in the Japan Patent Office on Jun. 17, 2024, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A driving circuit, having a plurality of stages and supplying a drive signal to scanning signal lines in a scanning signal line group in response to supplying a first clock signal and a second clock signal, the driving circuit comprising:

a first unit circuit forming one of the stages and outputting the drive signal to one of the scanning signal lines in the scanning signal line group, wherein the first unit circuit includes:

a node;

a first transistor that outputs the drive signal to the scanning signal line, with a gate electrode of the first transistor connected to the node, a source electrode of the first transistor supplied with the first clock signal and a drain electrode of the first transistor connected to the scanning signal line;

a second transistor that is supplied with a set signal for the first unit circuit, with a gate electrode of the second transistor supplied with the set signal and a drain electrode of the second transistor connected to the node;

a third transistor that is supplied with a reset signal for the first unit circuit, with a gate electrode of the third transistor supplied with the reset signal and a drain electrode of the third transistor connected to the node, wherein the second clock signal has a phase different from a phase of the first clock signal, and has a voltage remaining at a high level for a time period from a start point to an end point, the start point being prior to a time point of supplying the reset signal and within a time period throughout which a potential of the node is higher than a gate-on voltage of the third transistor and the end point falling between the time point of supplying the reset signal and a time point of stopping supplying the reset signal, and wherein the third transistor is configured to receive the second clock signal at a source electrode of the third transistor.

2. The driving circuit according to claim 1 further comprises a second unit circuit that outputs a drive signal in response to the supplying of the second clock signal.

3. The driving circuit according to claim 2 further comprises a third unit circuit that outputs a drive signal in response to supplying of a third clock signal, the third clock signal having a phase different from the phase of the first clock signal and a phase of the second clock signal, wherein the second unit circuit includes a fourth transistor that is supplied with a second-unit-circuit reset signal, with a gate electrode of the fourth transistor supplied with the second-unit-circuit reset signal and a source electrode of the fourth transistor supplied with the third clock signal.

4. A display device comprising:

the driving circuit according to claim 1; and a substrate where the scanning signal line group is mounted.

* * * * *